(12) United States Patent
De Leener et al.

(10) Patent No.: US 11,172,619 B2
(45) Date of Patent: Nov. 16, 2021

(54) AGRICULTURAL BALING MACHINE CLUTCH CONTROL

(71) Applicant: CNH Industrial America LLC, New Holland, PA (US)

(72) Inventors: Kenneth De Leener, Oostkamp (BE); Christiaan A C Lippens, Sint-Laureins (BE); Karel Naeyaert, Loppem (BE); Xavier G J M Bonte, Zuidzande (NL)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/091,638

(22) Filed: Nov. 6, 2020

(65) Prior Publication Data

US 2021/0137020 A1    May 13, 2021

(30) Foreign Application Priority Data

Nov. 8, 2019   (EP) ..................... 19208165

(51) Int. Cl.
*A01F 15/08* (2006.01)
*A01F 15/10* (2006.01)
*A01D 89/00* (2006.01)

(52) U.S. Cl.
CPC ............ *A01F 15/10* (2013.01); *A01D 89/002* (2013.01); *A01D 89/005* (2013.01); *A01F 15/0841* (2013.01); *A01F 2015/108* (2013.01)

(58) Field of Classification Search
CPC .. A01D 89/001; A01D 89/002; A01D 89/005; A01F 15/10; A01F 15/0841; A01F 2015/108; A01F 29/14; A01F 29/16
See application file for complete search history.

(56) References Cited

U.S. PATENT DOCUMENTS

| | | | | | |
|---|---|---|---|---|---|
| 5,787,694 | A | * | 8/1998 | Tertilt | A01D 89/005 56/14.5 |
| 8,206,205 | B2 | * | 6/2012 | Derscheid | A01F 29/10 460/2 |

(Continued)

FOREIGN PATENT DOCUMENTS

| EP | 2151156 A2 | 2/2010 |
|---|---|---|
| EP | 3636066 A1 | 4/2020 |

OTHER PUBLICATIONS

Extended European Search Report for EP application 19208165.1, dated May 20, 2020 (8 pages).

*Primary Examiner* — Adam J Behrens
(74) *Attorney, Agent, or Firm* — Peter Zacharias; Patrick Sheldrake

(57) ABSTRACT

An agricultural system including an agricultural baler and a control unit. The agricultural baler includes a pick-up arrangement for collecting plant matter. The pick-up arrangement includes a roller for feeding crop into the baler. The baler further includes a pick-up drive shaft for moving the roller at a desired rotational speed. The pick-up drive shaft is connected to the roller by a clutch for selectively transferring power between the pick-up drive shaft and the roller. The control unit is configured to: receive clutch-status-data indicative of an engagement status of the clutch; determine a speed-control-signal for varying the rotational speed of the pick-up drive shaft based on the clutch-status-data; and provide the speed-control-signal to a driveline for driving the pick-up drive shaft.

13 Claims, 6 Drawing Sheets

(56) References Cited

U.S. PATENT DOCUMENTS

| | | | | |
|---|---|---|---|---|
| 9,775,298 B2* | 10/2017 | Rosseel | ............... | A01D 89/002 |
| 2004/0093841 A1* | 5/2004 | Clauss | ................... | A01F 29/10 |
| | | | | 56/16.4 R |
| 2010/0036569 A1* | 2/2010 | Hel | ..................... | A01B 61/025 |
| | | | | 701/50 |
| 2020/0187423 A1* | 6/2020 | Tacke | ................... | A01F 15/101 |

* cited by examiner

AGRICULTURAL BALING MACHINE CLUTCH CONTROL

FIELD OF THE INVENTION

The disclosure relates to an agricultural system comprising an agricultural baler, particularly but not exclusively, a baler implement. Other aspects of the present disclosure relate to a method of controlling an agricultural baler and a corresponding computer program.

BACKGROUND OF THE DISCLOSURE

Balers are well known in agriculture and are widely used to bale plant matter in fields into bales that may be conveniently and effectively handled, stored and used. Balers are known that bale forage products such as grass and other leaves used as hay or other types of animal feed; straw or other plant parts resulting as by-products from a harvesting operation such as combine harvesting; cotton; and other plant parts of commercial or other value.

The majority of balers in use in Europe are designed to be towed behind an agricultural tractor or another towing vehicle that, under the control of an operator and/or using operator-monitored software, moves the baler about a field and provides power to operate internal parts of the baler. The provision of power is effected by way of a rotatable power take-off (PTO) shaft connected to the rotary power take-off that typically is part of the tractor.

Known designs of agricultural baler include a pick-up, mounted at the front of the machine, that causes the ingestion of plant matter into the interior of the machine as it moves about a field. Differing internal designs of baler components are known in the part of the machine downstream of the pick-up.

One commonplace type of baler is often referred to as a "rectangular baler". This includes a cuboidal bale-forming chamber in which the ingested plant matter is compacted into a cuboidal shape by a piston or plunger that reciprocates longitudinally back and forth inside the bale-forming chamber between retracted and extended positions. Charges of plant matter repeatedly are fed into the bale-forming chamber from the pick-up by the mechanism of the baler. This action is timed with the motion of the plunger such that feeding of plant matter coincides with retraction of the plunger to one end of the bale-forming chamber. The plant matter then is compacted by subsequent extension strokes of the plunger along the bale-forming chamber.

The reciprocal rectilinear motion of the plunger is effected using a driveline that converts rotary drive derived from the rotating PTO shaft, connected to the baler above the pick-up, into reciprocal motion of the plunger. This typically is achieved by changing, in the driveline, the axis of the rotation from one parallel to the longitudinal length of the baler to an axis of rotation transverse thereto.

Such transverse-axis rotation is applied to a crank that is pivot-jointed to one end of a conrod the other end of which is pivot-jointed to the plunger, that is moveably captive inside the bale-forming chamber. As a result, rotation of the crank causes the reciprocal movement of the plunger.

The driveline between the power take-off of the tractor and the plunger includes a clutch that in a typical case is formed of two or more dry friction plates that are urged into mutual engagement by a hydraulic actuator or spring arrangement. Additionally a heavy flywheel (that in some baler designs weighs 600 kg or more) is secured to a rotatable shaft that defines or is connected to an input shaft in turn connected in use to the PTO shaft.

The power take-off of the tractor is also used to drive the pick-up for collecting plant matter from the field. To protect the baler from overload damage caused by debris blocking the pick-up, some balers may include one or more clutches for disconnecting the pick-up from the power take-off if the pick-up is jammed. Operating a baler with such a clutch may be very challenging for the operator.

The present disclosure seeks to solve or ameliorate one or more problems of prior art balers.

Embodiments of the disclosure are suitable for inclusion in all baler types and machinery combinations disclosed herein. The disclosure of embodiments or parts of embodiments herein includes their disclosure in combination with all baler types and machinery combinations herein, even if these are indicated as forming part of the prior art.

The terms "baler" and "baling machine" are used synonymously herein and in the art generally.

The term "power take-off" is synonymous with the acronym "PTO".

The term "tractor" embraces a wide variety of machines potentially capable of towing a baler, as will be known to the person of skill in the art.

The term "clutch" except as otherwise explained embraces any design of clutch that is suitable for transferring drive in the circumstances described.

The term "plant matter" and derivatives potentially includes all types of matter that potentially may be ingested into a baler for the purpose of being formed into bales.

The terms "piston" and "plunger" in the context of the principal, moveable, bale-forming part of a bale-forming chamber are used synonymously herein.

SUMMARY OF THE DISCLOSURE

Aspects and embodiments of the disclosure provide an agricultural baler and a method for controlling an agricultural baler as claimed in the appended claims.

In a first aspect of the present disclosure there is provided an agricultural system, comprising:
  an agricultural baler comprising:
    a pick-up arrangement for collecting plant matter, the pick-up arrangement comprising at least one roller for feeding crop into the baler; and
    a pick-up drive shaft for moving the roller at a desired rotational speed, wherein the pick-up drive shaft is connected to the roller via at least one clutch for selectively transferring power between the pick-up drive shaft and the roller; and
    a control unit configured to:
    receive clutch-status-data indicative of an engagement status of the at least one clutch;
    determine a speed-control-signal for varying the rotational speed of the pick-up drive shaft on the basis of the clutch-status-data; and
    provide the speed-control-signal to a driveline for driving the pick-up drive shaft.

The new agricultural system of the present disclosure may be used to automatically re-engage/reduce the slip of the at least one clutch on the basis of the clutch-status-data.

In another embodiment, the clutch-status-data comprises one or more of:
  clutch-slip-data indicative of a difference in rotational speed between an input side and an output side of the at least one clutch;

position-data indicative of a location of an engagement component of the at least one clutch; and temperature-data indicative of heat generated within the at least one clutch.

In another embodiment, the control-unit is configured to determine a speed-control-signal for reducing the rotational speed of the pick-up drive shaft, if the clutch-status-data is indicative of clutch-slip occurring in the at least one clutch.

In another embodiment, the control unit is configured to determine a speed-control-signal for driving the pick-up drive shaft at:

a first rotational speed for normal operation of the pick-up arrangement;

a second rotational speed for re-engagement of the at least one clutch, the second rotational speed being slower than the first rotational speed, and wherein the control-unit is configured to determine a speed-control-signal for:

selecting the first rotational speed if the clutch-status-data is indicative of the at least one clutch being engaged; and selecting the second rotational speed if the clutch-status-data is indicative of clutch-slip occurring in the at least one clutch.

In another embodiment, the control-unit is configured to determine a speed-control-signal for selecting the first rotational speed if the clutch-status-data is indicative of the at least one clutch being engaged for a predetermined amount of time, when the pick-up drive shaft is being driven at the second rotational speed.

In another embodiment, the agricultural baler comprises a load sensor for determining a load acting on the roller during operation, and wherein the control unit is configured to determine a speed-control-signal applicable to select the first rotational speed only if the load acting on the roller is below a predetermined load threshold.

In another embodiment, the second rotational speed is a predetermined speed.

In another embodiment, the control unit is configured to determine a suitable second rotational speed, when the clutch-status-data is indicative of clutch-slip occurring in the at least one clutch, by decreasing the rotational speed of the pick-up drive shaft, starting from the first rotational speed, until the clutch-status-data is indicative of the at least one clutch being re-engaged.

In another embodiment, the at least one clutch is a radial pin slip-clutch.

In another embodiment, the agricultural baler comprises a rotary input shaft connected via the driveline to the pick-up drive shaft, and wherein the driveline includes a transmission for selectively moving the pick-up drive shaft at a various speeds that differs from a rotational speed of the input shaft.

In another embodiment, the transmission includes at least one transmission clutch for selectively transferring power between the input shaft and the pick-up drive shaft, and wherein the control unit is configured to provide the speed-control-signal to the at least one transmission clutch to control engagement of the at least one transmission clutch on the basis of the clutch-status-data.

In another embodiment, the transmission includes components defining at least first and second selectable transmission ratios between the input shaft and the pick-up drive shaft, the speed-control-signal applicable for selecting the first or the second transmission ratio, and wherein, when the second transmission ratio is selected, the pick-up drive shaft moves at a first rotational speed and, when the first transmission ratio is selected, the pick-up drive shaft moves at a second rotational speed, the second rotational speed being slower than the first rotational speed, and wherein the speed-control-signal is for selecting the first transmission ration if the clutch-status is indicative of clutch-slip occurring in the at least one clutch.

In another embodiment, the agricultural system comprises an agricultural work vehicle connected to the baler.

In another embodiment, the control-unit is configured to determine a work-vehicle-control-signal for slowing or stopping the work vehicle on the basis of the clutch-status-data.

In another embodiment, the work vehicle is capable of transferring rotational drive power to the baler, and wherein the control unit is configured to determine an input-power-control-signal for varying the amount of rotational drive power transferred from the work vehicle to the baler, on the basis of the clutch-status-data.

According to another aspect of the present disclosure, there is provided a computer-implemented method for controlling an agricultural baler, said agricultural baler (10) comprising:

a pick-up arrangement for collecting plant matter, the pick-up arrangement comprising at least one roller; and a pick-up drive shaft for moving the roller at a rotational speed, wherein the pick-up drive shaft is connected to the roller via at least one clutch for selectively transferring power to the roller, wherein the method comprises:

receiving clutch-status-data indicative of an engagement status of the at least one clutch;

determining a speed-control-signal for varying the rotational speed of the pick-up drive shaft on the basis of the clutch-status-data; and providing the speed-control-signal to a driveline for driving the pick-up drive shaft.

According to another aspect of the present disclosure, there is provided an agricultural machinery comprising any agricultural baler disclosed herein (e.g. a baler implement), a control unit and an agricultural vehicle for transporting the agricultural baler implement. There may be provided a computer program, which when run on a computer, causes the computer to configure any apparatus, including a control unit, disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium, which may be a physical computer readable medium such as a disc or a memory device or may be embodied as a transient signal. Such a transient signal may be a network download, including an internet download.

The agricultural work vehicle (or tractor) may include one or more control devices, such as but not limited to programmable or non-programmable processors. Similarly, the baler implement may include one or more control devices, such as but not limited to programmable or non-programmable processors. Additionally, or alternatively, the baler implement may be controlled by one or more control devices of the agricultural work vehicle. Similarly, the agricultural work vehicle may be controlled by one or more control devices of the baler implement.

The agricultural work vehicle and/or the baler implement may be remote controlled, e.g. from a farm office. Accordingly, the agricultural work vehicle may include one or more communication interfaces for connection to a remote processor and/or a remote controller. Similarly, the baler implement may include one or more communication interfaces for connection to a remote processor and/or a remote controller.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

There now follows a description of preferred embodiments of the disclosure, by way of non-limiting example, with reference being made to the accompanying drawings in which.

DETAILED DESCRIPTION OF THE DRAWINGS

Figure 1:
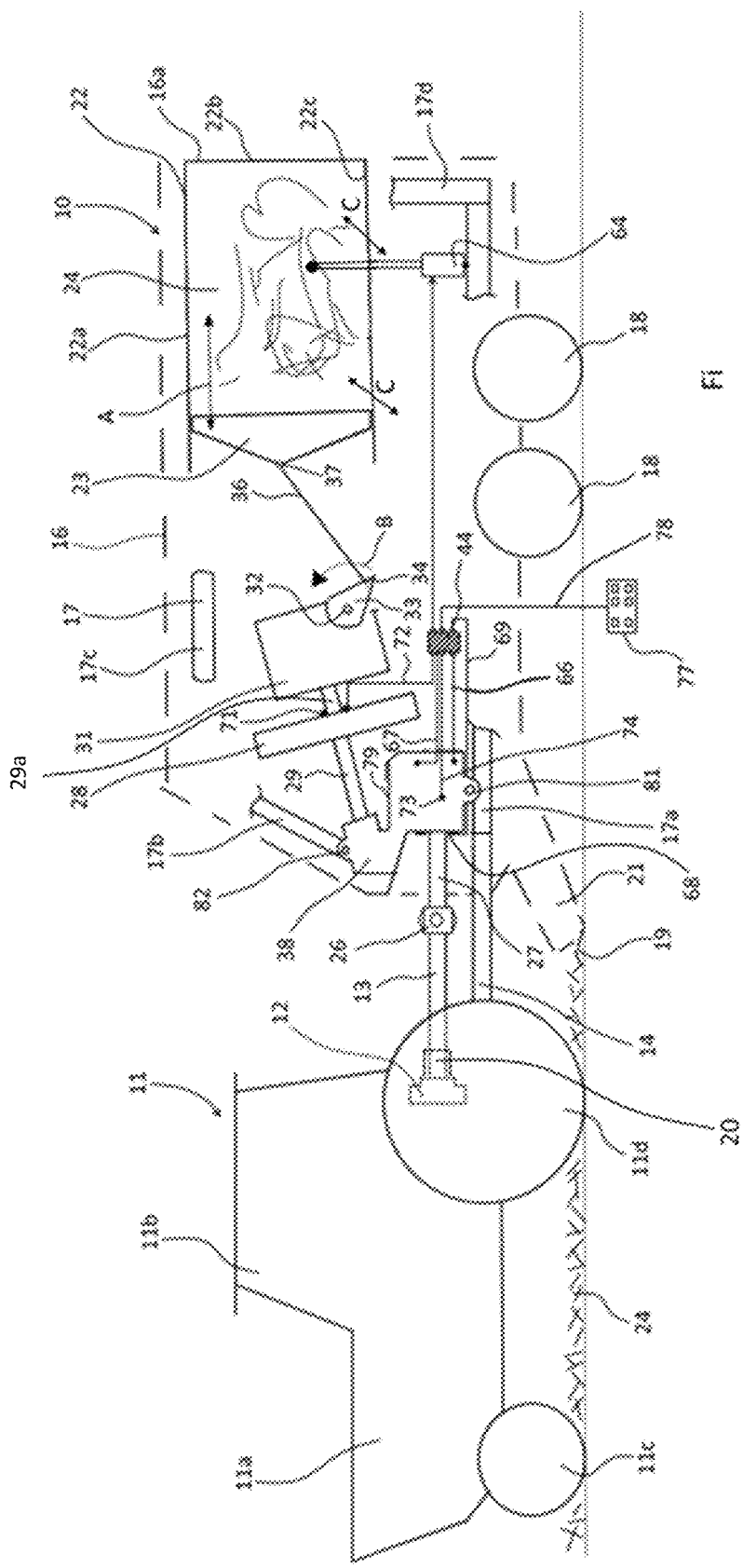
FIG. 1 is a schematic representation of a tractor-baling machine combination in accordance with embodiments described herein.

Referring to the drawings a baling machine 10 is shown being towed behind an agricultural work vehicle (towing vehicle) that in the illustrated embodiment non-limitingly is an agricultural tractor 11.

The tractor 11 is a conventional tractor including a vehicle frame/body 11a, rear-mounted cab 11b, front, steerable, ground-engaging wheels 11c and rear, driven, ground-engaging wheels 11d. Tractor 11 includes at its rear end between the rear wheels 11d a power take-off 12 of a conventional design that includes a rotative coupling for a PTO shaft 13 that extends rearwardly of the tractor 11. The PTO 12 may be engaged to cause rotation of the PTO shaft 13 or disengaged, such that the shaft 13 is not powered to rotate, for example through the operation of a control lever or pushbutton.

The tractor 11 may have any of a range of engine power outputs including but not limited to 200 hp, 300 hp and 400 hp. The baling machine 10 is operable when towed by any such tractor 11, without a need for adjustment or modification, for the reasons explained below.

The PTO shaft 13 may be any of a variety of lengths. A relatively short PTO shaft 13 and drawbar 14 (described below) minimises the distance between the pick-up arrangement 19 (described below) of the baling machine 10 and the tractor 10. This provides certain advantages, although in some other respects a longer PTO shaft 13 may provide good adjustment flexibility.

The partial driveline represented by the PTO 12 and PTO shaft 13 may in various types of tractor include a PTO clutch 20 that as described above seeks to protect the engine of the tractor 11 from damage caused e.g. when an excessive loading on the PTO shaft causes engine stalling. The PTO clutch 20 is shown schematically in FIG. 1. It may readily be envisaged by the person of skill in the art and typically would be a one-way clutch of a kind that permits free movement when rotating in one direction, and transfers rotary drive via the PTO shaft 13 when rotating in the opposite direction. Other forms and locations are possible in respect of the clutch 20.

The baling machine 10, i.e. a baling implement, is secured to the rear of the tractor 11 by way of a drawbar 14 that typically is of an "A"-shape when viewed in plan and extends forwardly of the baling machine 10 below the PTO shaft 13. The drawbar 14 is pivotably secured to a conventional towing hitch at the rear of the tractor 11.

The baling machine 10 includes a housing or cover 16 that may take a variety of forms. The housing 16 in most baling machine designs includes a section 16a that is open to permit ejection of formed bales at the rear of the baling machine 10.

Panels defining the housing 16 further may be openable or removable in order to permit maintenance of the interior parts of the baling machine 10 replacement of bobbins of twine used for tying completed bales or the clearance of blockages that can arise for a variety of reasons.

The housing 16 of the baling machine 10 is secured to a baling machine frame 17 selected parts 17a, 17b, 17c, 17d of which are illustrated in FIG. 1, with the complete frame 17 being omitted for ease of illustration.

The baling machine 10 is mobile and to this end it includes secured to the frame 17 two or more ground-engaging wheels 18.

In the embodiment illustrated, four wheels are provided, being left and right front wheels and left and right rear wheels 18. In FIG. 1 the left-hand side front and rear wheels are visible.

In this regard the front or forward end of the baling machine 10 is the end of it that is closest to the towing tractor 11, and the terms "rear", "left", "right", "upper", "lower" and derivative terms are interpreted accordingly and as though an observer is looking forwardly along the baling machine 10.

The wheels 18 may be mounted relative to the frame 17 by way of suspension components and passive or active steering components as would be known to the person of skill in the art, or they may be mounted more simply. The wheels 18 optionally may include tyres and/or gripping elements that are omitted from FIG. 1 for ease of viewing.

A pick-up arrangement 19 projects forwardly of the baling machine 10 and is arranged to collect cut plant matter 24 lying in a field in which the baling machine 10 moves as influenced by the motion of the tractor 11. The pick-up arrangement 19 includes one or more rollers for picking up, and optionally cutting, the plant matter and passing it to a conveyor 21. The conveyor 21 conveys the plant matter inside the baling machine 10 where it undergoes baling.

Numerous designs of pick-up arrangement 19 and conveyor 21 are known in the baling machine art and fall within the scope of embodiments disclosed herein. One example shall be discussed in more detail below with reference to FIGS. 3 to 5.

As mentioned, the baling machine 10 includes an internal bale-forming chamber 22. This is an elongate, cuboidal volume defined by chamber walls of which top and bottom walls 22a and 22c are visible in FIG. 1. The bale-forming chamber 22 in a typical baling machine design extends in a fore and aft direction in an upper part of the rear of the volume enclosed by the housing 16.

The rear 22b of the bale-forming chamber coincides with the aforementioned open housing section 16a in order to allow ejection of completed bales in a per se known manner.

A crop flow path exists inside the baling machine 10 between the conveyor 21 and the bale-forming chamber 22. The crop flow path may readily be envisaged and is omitted from the figures for clarity.

The forwardmost end of the bale-forming chamber 22 is essentially open. A plunger 23 occupies the interior cross-section of the bale-forming chamber 22 and is constrained to move longitudinally inside the chamber 22 from the open, forward end towards and away from the rear 22b of the bale-forming chamber 22 as signified by arrow A.

The PTO shaft 13 as mentioned may be powered to rotate, in virtually all tractors in a clockwise direction when viewed from behind the tractor 11. PTO shaft 13 is connected by way of at least one, and in practice at least two, universal joint 26 to the forwardmost end of a rotary input shaft 27 of the baling machine 10. The universal joint 26 in a well-known manner accommodates changes in the relative orientation of the tractor 11 and baling machine 10 that result from towing of the baling machine from place to place, e.g. while the baler is working or when it is travelling between fields.

The input shaft 27 is supported e.g. using journal bearings that are omitted from FIG. 1 for ease of viewing and connects by way of a driveline, described in more detail below, to a rotatable flywheel 28.

Flywheel 28 is supported on a flywheel shaft 29 that also is supported using journal bearings, or a functionally similar arrangement, that further is omitted from FIG. 1. The functions of the flywheel 28 are as described above, although as explained it is possible for the flywheel 28 in embodiments of the disclosure to be made considerably lighter than some prior art flywheels.

The rear end 29a of the flywheel shaft 29 is a rotary input to a drive converter 31 or similar transmission that by way of intermeshing gear components alters the axis of rotation of rotative energy in the baling machine 10. This drive converter 31 may be referred to as a main transmission in some examples.

The nature of the drive converter 31 thus is such that the longitudinally extending (with reference to the elongate length of the baling machine 10 as illustrated) axis of rotation of the flywheel shaft 29 becomes rotation about a transversely extending axis of a crankshaft 32.

The crankshaft 32 is connected to a pair of crank members (only the right one is shown as 33) that protrude from the drive converter 31 in a manner presenting free ends. The pair of crank members and corresponding conrods (only the right one shown as 36) connect the crankshaft 32 of the drive converter 31 with the forward side of the plunger 23. A first, right side crank member 33 has a first end connected to the crankshaft 32 of the drive converter 31. A second end of the first, right side crank member 33 is connected to a first end 34 of a first, right side conrod 36. The first, right side conrod 36 has a second end 37 connected to the plunger 23. A second, left side crank member (not shown) has a first end connected to the crankshaft 32 of the drive converter 31. A second end of the second, left side crank member is connected to a first end of a second, left side conrod (not shown). The second, left side conrod has a second end (not shown) connected to the plunger 23.

As is apparent from FIG. 1, therefore, rotation of crankshaft 32 causes rotation of crank member 33, as signified by arrow B, that gives rise to the rectilinear, reciprocal motion of plunger 23 indicated by arrow A.

In this regard it is somewhat arbitrary whether crank 33 rotates clockwise or anti-clockwise, since reciprocal motion of the plunger 23 may in an appropriately designed set of driveline elements be achieved regardless of the direction of rotation of the crank 33. The actual rotational direction of the crank 33 would be a consequence of the internal design of the drive converter 31. Such aspects are not relevant to an understanding of the disclosure, and therefore are not provided in detail herein.

Charges of plant matter 24 conveyed inside the baling machine 10 from the conveyor 21 repeatedly are at intervals fed by internal components of the baling machine 10, that are omitted from FIG. 1 for clarity, into the interior of the bale-forming chamber 22 for compaction by reason of the reciprocal, rectilinear motion (arrow A) of the plunger 23. The feeding of each charge of plant matter 24 is timed to coincide with positioning of the plunger 23 at its retracted, i.e. forwardmost position, with the result that the plant matter 24 becomes compressed and compacted by the movement of the plunger 23 into bale form after it has been fed in to the bale-forming chamber 22.

The driveline defined between the input shaft 27 and the flywheel shaft 29 includes a transmission 38 that is described below in relation to FIGS. 2 and 3.

Figure 2:
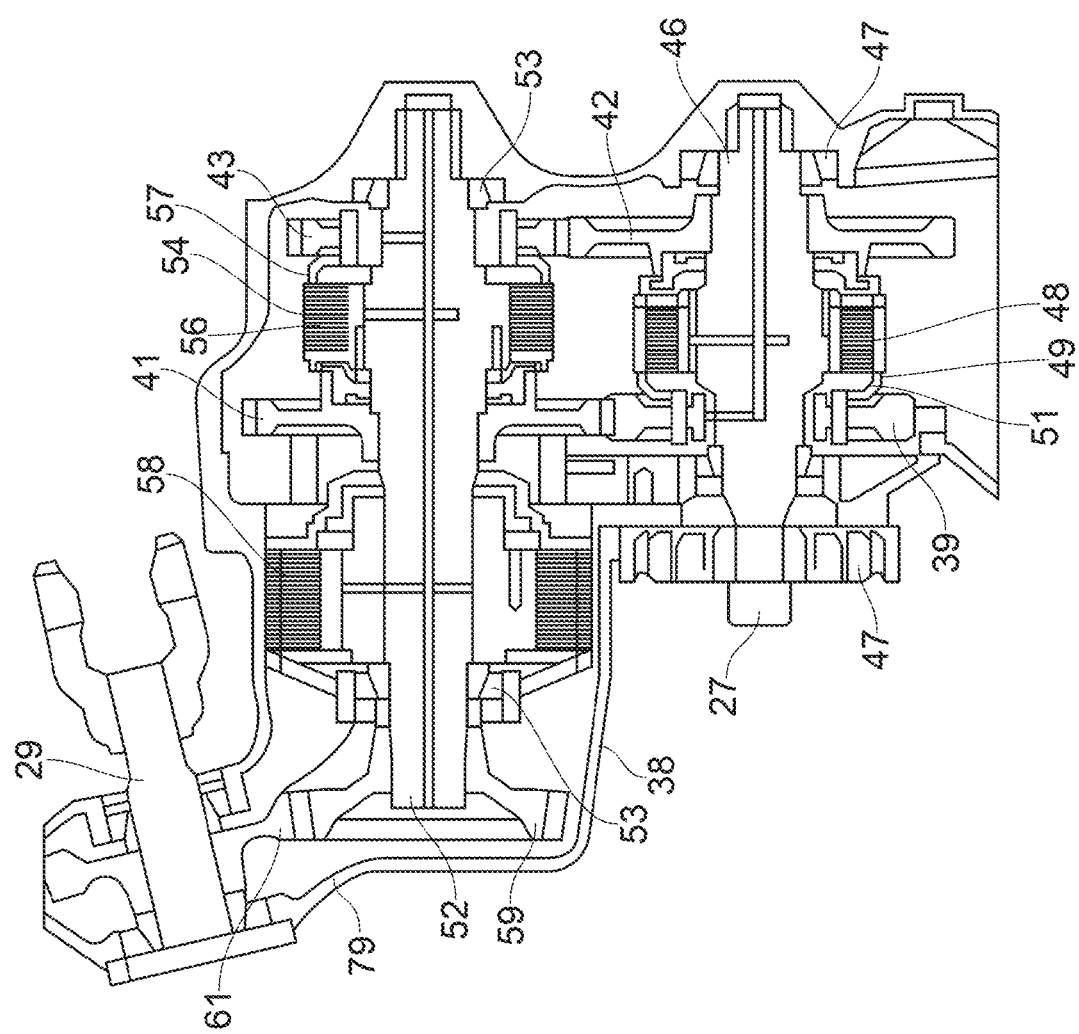
FIG. 2 is a cross-sectional view of a transmission, forming part of the baling machine visible in FIG. 1, according to embodiments described herein.
Figure 3:
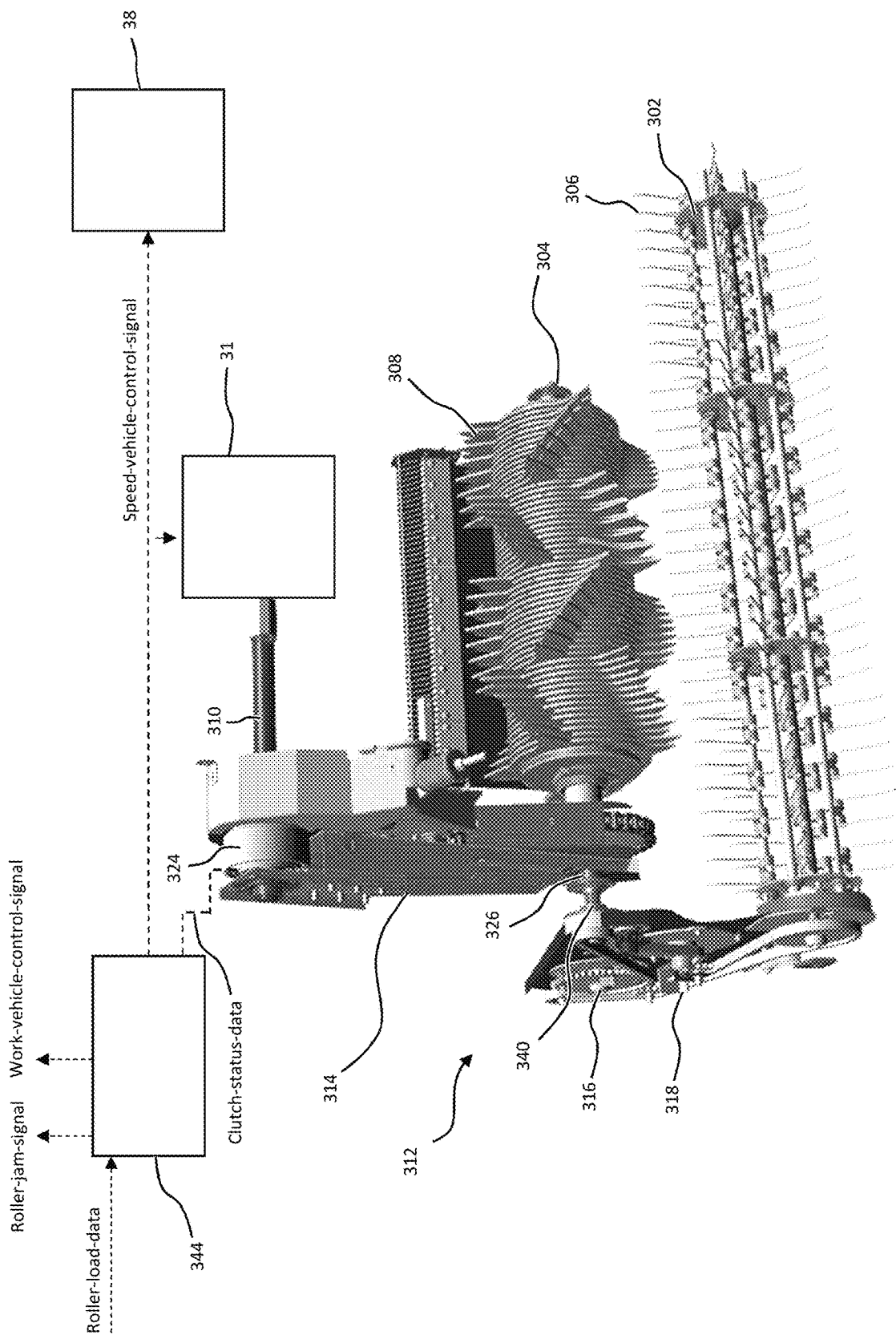
FIG. 3 is a perspective view of parts of a pick-up arrangement.

In FIGS. 2 and 3 the transmission 38 connects the rotary input shaft 27 to the flywheel shaft 29 at first and second selectable transmission ratios defined by driveline components within the transmission 38.

A first transmission ratio is defined by mutually meshing, rotary, toothed gears 39, 41 that each are supported for rotation within the transmission 38. The first transmission ratio is a relatively great reduction ratio transmission providing a high degree of mechanical advantage.

A second transmission ratio is defined by mutually meshing, rotary, toothed gears 42, 43 that each are supported for rotation within the transmission 38 adjacent the gears 39, 41 in a manner defining a parallel driveline to that representing the first transmission ratio. The second transmission ratio is a relatively close reduction ratio transmission providing a higher speed of output shaft rotation than the first transmission ratio.

The baling machine 10 includes a control unit 44, non-limitingly illustrated schematically in FIG. 1, in the form of a programmable microprocessor. The baling machine 10 includes a source of electrical power, for the control unit 44, that in preferred embodiments may take the form of a rotary generator that is driven directly or indirectly by the PTO shaft, although other sources of electrical power including batteries and other storage devices, or other types of generator, are possible. Combinations of electrical power sources furthermore are possible.

As indicated, the control unit may take a variety of forms and need not be a control unit as illustrated, or a single component.

The control unit 44 is capable (typically but not necessarily as a result of software and/or firmware programming) of selectively engaging the first or the second transmission ratio. The arrangement of the components and/or the programming of the control unit 44 prevents the first and second transmission ratios from being selected simultaneously.

As best illustrated in FIGS. 2 and 3, the input shaft 27 rigidly connects to an input gear shaft 46 that is supported (non-limitingly in the embodiment illustrated by way of journal bearings 47 at either end) for rotational movement inside the transmission 38. The input gear shaft 46 is locked to the gear 42 such that the gear 42 always rotates with the input gear shaft 46.

The input gear shaft 46 is also locked to an input side 48 of first transmission clutch 49 forming part of the driveline. As a result the input side 48 of the first transmission clutch 49 also rotates with the input gear shaft 46.

The first transmission clutch 49 is e.g. electrically or electro-hydraulically activated in the described embodiment, and is selectively engageable under command from the control unit 44. When engaged the output side 51 of the first transmission clutch 49 is locked to the input side 48 and rotates therewith.

The output side 51 of first transmission clutch 49 is locked to the gear 39 of the first transmission ratio such that the gear 39 rotates with the output side 51.

In the illustrated embodiment the first transmission clutch 49 lies on the first gear shaft 46 intermediate the gears 39 and 42, but as will occur to the person of skill in the art this need not be the case, and other clutch and gear position combinations are possible.

As explained the gears 42 and 43 are mutually meshed, with the gear 43 supported on the rotational intermediate gear shaft 52. The intermediate gear shaft 52 is supported (in the non-limiting example shown by way of journal bearings 53 at either end) for rotation relative to the remainder of the transmission 38.

By reason of locking of the input gear shaft 46 to the gear 42, the gear 43 rotates whenever the input gear shaft 46 rotates, at a speed, relative to the speed of the input gear shaft 46, determined by the gear tooth ratio between the gears 42 and 43. However, the gear 43 merely idles unless a second transmission clutch 54, which may be of a similar design to the first transmission clutch 49 and hence operable under command of the control unit 44, is engaged.

In this respect, the intermediate gear shaft 52 is locked to an input side 56 of second transmission clutch 54; and an output side 57 is locked to the gear 43. As a result, when the clutch is engaged, rotation of gear 43 is transmitted via the intermediate gear shaft 52.

The gear 39 is meshed with the gear 41 as explained. The gear 41 is locked to the intermediate gear shaft 52. Clearly, therefore, to avoid locking up of the transmission it is essential that only one of the transmission clutches 49, 54 is engaged at a time. When the first transmission clutch 49 is engaged and the second transmission clutch 54 is disengaged, drive from the input shaft 27 is transmitted via the meshed gears 39 and 41 to drive intermediate gear shaft 52 in accordance with the first, reduction transmission ratio "G1" determined by the numbers of teeth of gears 39 and 41. At this time, the gears 42 and 43 rotate in an idling manner.

When the first transmission clutch 49 is disengaged and the second transmission clutch 54 is engaged, the drive of the input shaft 27 is transmitted via the gears 42 and 43 to the drive intermediate gear shaft 52 in accordance with the second transmission ratio "G2" determined by the numbers of teeth of the gears 42 and 43.

As explained herein, the first transmission ratio G1 is a reduction ratio in which the speed ratio exceeds 1. This provides a beneficial mechanical advantage when moving the flywheel 28 from rest. The second transmission ratio G2 is an accelerative ratio the speed ratio of which is a value less than 1. This causes rotation of the flywheel shaft 29 to be at a higher speed than that of the PTO shaft 13.

It is possible for both the clutches 49, 52 to be disengaged simultaneously. In that case gears 42 and 43 would rotate, but no drive would be transmitted to intermediate gear shaft 52.

The intermediate gear shaft 52 includes, mounted thereon, an optional brake 58 that may be employed when both the transmission clutches 49, 52 are disengaged to slow the flywheel shaft 29. The latter receives the rotary drive of intermediate gear shaft 52, when one of the transmission clutches 49, 54 is closed, via meshed output gears 59, 61.

The numbers of teeth of the gears 39, 41, 42, 43, 59 and 61 may be varied extensively in all the gears of the transmission 38 depending on the precise design of the transmission 38. The overall numbers of drive-transferring components in the transmission may be varied. Also as explained the driveline elements defining the transmission ratios need not be meshing, toothed gears and instead may adopt a range of other forms, including but not limited to the examples given above.

The transmission clutches 49 and 54 may be for example electrically (e.g. solenoid) operated, electro-mechanically operated or electro-hydraulically operated, under the control of the control unit 44. Preferably, but not essentially, the transmission clutches 49, 54 are spooled wet clutches the nature of which is familiar to the person of skill in the art and therefore does not require describing in detail herein. Wet clutches generally are highly suitable for computer or other electronic control, leading to rapid clutch engagement and disengagement.

One form of control of the transmission clutches 49, 54 is by electrical control signals transmitted from the control unit 44 to the first and second transmission clutches 49, 54. One form of control of the transmission clutches 49, 54 is illustrated schematically by electrical control signal line 66 (FIG. 1) that transmits commands from the control unit 44 to first transmission clutch 49; and control line 67 that transmits commands from the control unit 44 to second transmission clutch 54.

Two-way communication between the transmission clutches 49, 54 and the control unit 44 optionally is possible. Using two-way control, the transmission clutches 49, 54 can signify e.g. their operational (i.e. engaged or disengaged) status, information on the condition of wear parts such as friction plates, levels of clutch fluid in the event of the clutches being wet clutches as is preferred and similar operational variables. The control unit 44 can generate commands and/or warning signals in dependence on the signals received from the transmission clutches 49, 54.

The control unit 44 may further be connected to a rotational speed sensor 68 and/or an oil temperature sensor 73 via electric signal line 74.

The control unit 44 is capable of selectively disengaging the rotary drive between the input shaft 27 and the shaft 29 supporting the flywheel 28. This possibility is explained further below in connection with operational sequences made possible by the apparatus of the disclosure. The control unit 44 may also be capable of selectively activating the brake 58 of the transmission 38. Activation of the brake 58 will actively slow the rotational speed of the flywheel shaft 29 and thus the speed of the flywheel 28 connected to the flywheel shaft 28.

The baling machine 10 optionally may include one or more input devices 77, represented schematically and non-limitingly in FIG. 1, by means of which the operator may provide input-power-data, such as a maximum power output of the corresponding towing vehicle (tractor), to the control unit 44.

In FIG. 1 an input device 77 is shown in the form of a keypad connected to the control unit 44 via an electrical cable 78, and using which e.g. the rated power output of the tractor 11 can be input to the baling machine 10. As will be described in more detail below, the control unit 44 can determine a suitable clutch-control-signal that is optimised for the input power provided by the tractor.

The input device 77 may take a variety of other forms and may be provided anywhere on the baler 10 and/or the corresponding tractor 11. In some embodiments, the input device 77 may be provided remotely and in communication with receivers mounted on the tractor 11 or the baler 10. The input device 77 may include a code reader that can read a code printed or affixed on part of the tractor 11, e.g. adjacent the PTO; a near-field communications (NFC) device that establishes a communications link with a control unit forming part of the tractor 11 in order to download power output information; or a cable connection between the control unit 44 and a counterpart control unit forming part of the tractor 11.

The transmission 38 may include a rigid housing 79 that may be formed e.g. by casting from a metal alloy, especially a high stiffness, lightweight alloy.

As explained the baling machine 10 includes a number of frame elements 17. The housing 79 may be positioned to interconnect two or more such frame members (e.g. frame members 17a and 17b as non-limitingly illustrated in FIG. 1) in a manner enhancing the stiffness of the frame 17 of the baling machine 10.

In the illustrated embodiment such interconnection is achieved by way of perforated lugs 81, 82 by means of which the housing 79 is bolted to interconnect two frame members, but as will be apparent to the person of skill in the art such interconnection may be achieved in a variety of alternative ways.

The layout of the components of the transmission 38 inside the housing 79 is such that the driveline components 39, 41 defining the first transmission ratio occupy a first vertically extending distance in the housing 79; and the driveline components 42, 43 defining the second transmission ratio occupy a second vertically extending distance in the gearbox housing, the upper limit of the second vertically extending distance terminating below the upper limit of the first vertically extending distance.

This means that the transmission 38 is compact in the longitudinal dimension of the baling machine 10, and also that the output of the transmission 38 is connected to the flywheel shaft 29 at a relatively high point in the baling machine 10. This provides several advantages in terms of transferring drive input via the input shaft 27 to the location of the plunger 23, which as mentioned is located relatively high inside the baling machine 10.

Turning to FIG. 3, there is shown a perspective view of parts of a pick-up arrangement of an agricultural baler. The components shown in FIG. 3 may be part of the pick-up arrangement 19 shown in FIG. 1. The illustration of FIG. 3 shows that the pick-up arrangement comprises two rollers, namely a pick-up roller 302 and a cutter roller 304. It will be appreciated that the pick-up arrangement may also have further or fewer rollers for picking up and processing the plant matter.

The pick-up roller 302 comprises a plurality of tines 306 distributed circumferentially around the pick-up roller. Each of the tines 306 extends radially outwards from the pick-up roller 302 so as to penetrate and lift plant matter that is typically deposited in windrows on the field.

The cutter roller 304 is arranged in parallel with the pick-up roller 303. The cutter roller 304 comprises a plurality of cutter blades 308 protruding radially from the cutter roller 304. In the embodiment shown in FIG. 3, the cutter blades 308 have a substantially W-shaped pattern that guarantees an even spread of the cutting force for uniform cutting of the plant matter. The W-shaped design of the cutter blades 308 also ensures an equal distribution of the plant matter across the width of the pre-compression chamber.

The pick-up arrangement receives rotational power from a pick-up drive shaft 310. The pick-up drive shaft 310, in the embodiment of FIG. 3, is connected to an outlet of the converter 31 shown in FIG. 1. The converter 31 can also be described as a main gearbox of the agricultural baler 10. In one example, the drive shaft 310 provide drive power to all of the rollers and other moveable parts of the pick-up arrangement. That is, in the embodiment of FIG. 3, the pick-up drive shaft 310 transfers rotational power to the pick-up roller 302 and the cutter roller 304. To this end, the pick-up drive shaft 310 is connected to the cutter roller 304 and the pick-up roller 302 via a pick-up transmission 312.

The pick-up transmission 312 comprises a first chain arrangement 314 for transferring the rotational power of the pick-up drive shaft 310 to a rotor shaft 326. An intermediate shaft 316 extends from the rotor shaft 326. The pick-up transmission 312 comprises a second chain arrangement 318 for transmitting rotational power from the intermediate shaft 316, which is a direct extension of the rotor shaft 326, to a drive shaft of the pick-up roller 302. Both the first and second chain arrangements 314, 318 may include various gears, pullies, chains, belts, etc for conversion of the speed and torque provided between the pick-up drive shaft 310 and the two rollers 302, 304.

Figure 4:
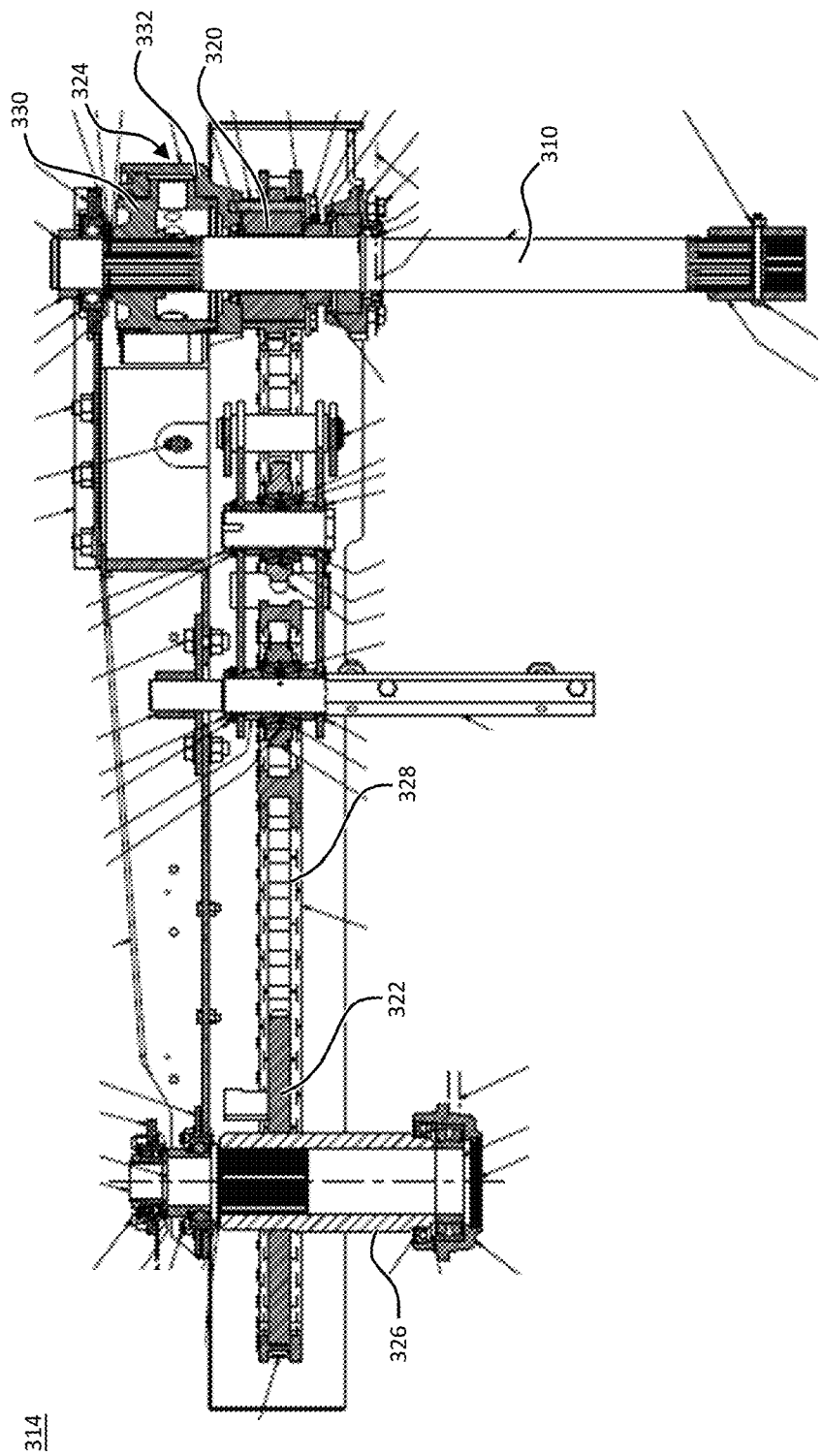
FIG. 4 is a cross-section of a part of the pick-up arrangement shown in FIG. 3.

Turning to FIG. 4, there is shown a cross-section through an exemplary embodiment of a chain arrangement that may be used as the first chain arrangement 314 shown in FIG. 3. The chain arrangement 314 comprises a first sprocket 320 and a second sprocket 322. The first sprocket 320 is selectively connectable to the pick-up drive shaft 310 by means of a first clutch 324, which will be described in more detail below. The first sprocket 320 is connected to the second sprocket 322 for driving the rotor shaft 326 and the intermediate shaft 316, for example by means of a gear chain 328.

In the embodiment of FIGS. 3 and 4, the second sprocket 322 is connected to a rotor shaft 326 of the cutter roller 304. The rotor shaft 326, in turn, is connected to the intermediate shaft 316. It follows that the intermediate shaft 316 is connected to the second sprocket 322 via the rotor shaft 326 of the cutter roller 304.

The first sprocket 320 may be smaller than the second sprocket 322, such that the rotational speed of the intermediate shaft 316 will be slower than the rotational speed of the pick-up drive shaft 310.

In the embodiment of FIGS. 3 and 4, the intermediate shaft 316 is arranged coaxially with the rotor shaft 326 of the cutter roller 304. The intermediate shaft 316 is connected to the rotor shaft 326 by means of a second clutch 340 that will be explained in more detail below.

As mentioned before, the rotational input power provided by the pick-up drive shaft 310 is introduced into the pick-up transmission 312, particularly into the first chain arrangement 314, via a first clutch 324. The first clutch 324 prevents overload damage in the pick-up transmission 312, e.g. due to blockages within the cutter roller 304. In one example, the first clutch 324 may be designed to disengage if debris, such as stones or lumps of soil, block the rotation of the cutter roller 304. Accordingly, the first clutch 324 may also be referred to as a cutter-roller-cut-out clutch.

The first clutch 324 comprises a clutch rotor 330 arranged within a rotatable clutch housing 332. In the embodiment of FIG. 4, the rotatable clutch housing 332 is permanently connected to the first sprocket 320 of the first chain arrangement 314.

Figure 5:
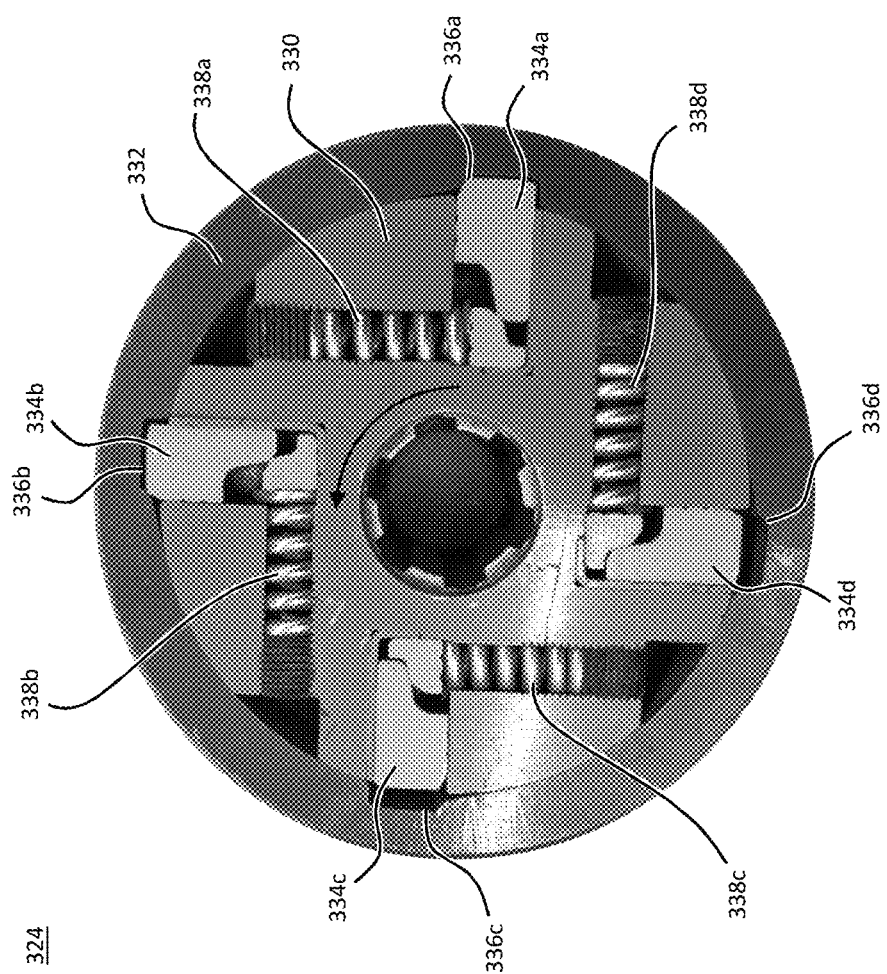
FIG. 5 is a cross-section of a first clutch shown in FIGS. 3 and 4.

Turning to FIG. 5, there is shown a cross-section of the first clutch 324 shown in FIGS. 3 and 4. The first clutch 324 shown in FIG. 5 is a radial-pin clutch. In other words, one or more radial pins 334a, 334b, 334c, 334d are part of the first clutch 324. The radial pins 334a, 334b, 334c, 334d are movable in a substantially radial direction of the clutch rotor 330 between an extended position (cf. radial pin 334a) in which the radial pins 334a, 334b, 334c, 334d protrude from an outer surface of the clutch rotor 330 and into corresponding recesses 336a, 336b, 336c, 336d arranged on an inner surface of the clutch housing 332. The radial pins 334a, 334b, 334c, 334d are biased towards their extended position via coil springs 338a, 338b, 338c, 338d.

A first radial pin 334a is shown in its fully extended state, in which the radial pin 334a is fully inserted into a corresponding, first recess 336a of the clutch housing 332. In this state, rotational power may be transferred from the clutch rotor 330 to the clutch housing 332. If the clutch rotor 330 of FIG. 5 is rotated in an anti-clockwise direction, the radial pins 334a, 334b, 334c, 334d bush against a left side edge of their respective recess 336a, 336b, 336c, 336d. This will cause the rotatable clutch housing 332 to rotate together with the clutch rotor 330, in an anti-clockwise direction.

Any resistance to the rotation of the rotatable clutch housing 332, i.e. any load acting on the rollers 302, 304, may introduce a counter-acting force that pushes the radial pins 334a, 334b, 334c, 334d towards their retracted state, against the bias of the corresponding coil springs 338a, 338b, 338c, 338d. When the counter-acting force overcomes the bias of the corresponding springs 338a, 338b, 338c, 338d, the radial pins 334a, 334b, 334c, 334d will be transferred into their fully retracted position.

An example of the above is shown in the second radial pin 334b, which shows a situation in which the load applied to the clutch housing 332 is starting to overcome the bias of the coil spring 338b, thereby resulting in slip between the clutch rotor 330 and the clutch housing 332 that acts to push the radial pin 334 further towards the centre of the clutch rotor 330 until the radial pin no longer protrudes from the outer surface of the clutch rotor 330. This is, in turn, shown in the third and fourth radial pins 334c, 334d, which are both fully retracted, such that they no longer engage with the corresponding recesses 336c and 336d of the clutch housing 332.

It will be appreciated that the radial pins of FIG. 5 are shown in different states for clarification only. In operation, the radial pins 334a, 334b, 334c, 334d of the clutch rotor 330 will be extended and retracted at the same time. Once all of the radial pins 334a, 334b, 334c, 334d are fully retracted, the clutch rotor 330 will rotate within the clutch housing 332 without transferring significant amounts of rotational power to the clutch housing 332. In other words, when the radial pins 334a, 334b, 334c, 334d are fully retracted, the first clutch is disengaged such that rotational power is no longer transferred from the pick-up drive shaft 310 to the rollers 302, 304 of the pick-up arrangement.

The first clutch 324 will remain disengaged for as long as the clutch rotor 330, which is driven by the pick-up input shaft 310, maintains its rotational speed. This may even be the case if the overload on the clutch housing 332 is removed, i.e. if blockages within the rollers 302, 304 are removed. In order to re-engage the first clutch 324, the rotational speed of the pick-up drive shaft 310, and therefore the rotational speed of the clutch rotor 330 have to be decreased until the radial pins 334a, 334b, 334c, 334d catch back into corresponding the recesses 336a to 336d of the clutch housing 332. This may be achieved by active management of the PTO shaft speed by the operator, e.g. a significant reduction of the PTO shaft speed or even a temporary shutdown of the entire system.

Turning back to FIG. 3, there is shown a second clutch 340, which is arranged between the rotor shaft 326 and intermediate shaft 316. The second clutch 340 may be a friction clutch for selectively connecting and disconnecting the second chain arrangement 318 and, therefore, the pick-up roller 302 and the intermediate shaft 316 from the second sprocket 322. The second clutch 340 will enable independent cut out of the pick-up roller 302 without affecting rotation of the cutter roller 304. The second clutch 340 may thus be referred to as a pick-up-roller-cut-out clutch.

If both clutches 324, 340 are engaged, then rotational drive power is transferred from the pick-up drive shaft 310 to both rollers 302, 304. If only the second clutch 340 is disengaged, the rotational power is transferred from the pick-up drive shaft 310 to the cutter roller 304 only. If the second clutch 324 is disengaged, then no rotational power is transferred from the pick-up drive shaft 310 towards the pick-up arrangement. It follows that, if the first clutch 324 is disengaged, neither the pick-up roller 302, nor the cutter roller 304 are provided with rotational power from the pick-up drive shaft 310.

FIG. 3 further shows a control unit 344, such as the baler control unit 44 described with respect to FIG. 1. The control unit 344 of this embodiment may be for automatically controlling the speed of the pick-up drive shaft 310 depending on the status of the first clutch 324. To this end, the control unit 344 may receive clutch-status-data indicative of an engagement status of the first clutch 324. As will be appreciated, various clutch-status-data may be suitable to provide a status of the first clutch 324 to the control unit 344. A non-exhaustive number of clutch-status-data examples is described below.

In one example, the clutch-status-data may include clutch-slip-data indicative of a difference in rotational speed between an input side and an output side of the first clutch 324.

In one embodiment the clutch-slip-data may include drive-shaft-speed-data, representative of rotational speeds of the pick-up drive shaft 310, and intermediate-shaft-speed-data, representative of a rotational speed of the intermediate shaft 316. The control unit 344 may calculate a total amount of clutch-slip occurring within the first clutch 324 and the second clutch 340 on the basis of a comparison of the drive-shaft-speed-data and the intermediate-shaft-speed-data. The control unit 344 may compare the so calculated clutch-slip of the two clutches 324, 340 with a clutch-slip-threshold to determine the engagement status the clutches 324, 340. For example, if the comparison result between the drive-shaft-speed-data and the intermediate-shaft-speed-data indicates that the clutch-slip in the two clutches 324, 340 exceeds the clutch-slip-threshold, the control unit may determine that the pick-up drive shaft rotational speed needs to be reduced. Similarly, if the clutch-slip remains below the clutch-slip-threshold, the control unit 344 may determine that the pick-up drive shaft rotational speed does not need to be reduced.

As will be appreciated, in the above embodiment, the clutch-slip-data may not be used to determine which of the two clutches 324, 340 of the pick-up arrangement is disengaged/slips. In particular, a comparison of the drive-shaft-speed-data and the intermediate-shaft-speed-data (both provided with the clutch-slip-data) may exceed the clutch-slip-threshold in each of the following three scenarios:

1) if both clutches 324, 340 experience slip and are therefore both fully or partly disengaged,
2) if only the first clutch 324 is disengaged; or
3) if only the second clutch 340 is disengaged.

In other words, in the above embodiment, the clutch-slip-data may not enable the control unit to determine which of the two clutches 324, 340 is disengaged. In most cases, however, it will not be essential to determine which of the two clutches 324, 340 has disengaged as a reduction in pick-up drive shaft speed may be the appropriate remedial action in each of the three cases outlined above.

The clutch-status-data in another embodiment may comprise drive-shaft-speed-data, representative of rotational speeds of the pick-up drive shaft 310, and rotor-shaft-speed-data, representative of a rotational speed of the rotor shaft 326. The control unit 344 may calculate ab amount of clutch-slip occurring within (only) the first clutch 324 on the basis of a comparison of the drive-shaft-speed-data and the rotor-shaft-speed-data. The control unit 344 may compare the so calculated clutch-slip of the first clutch 324 with a clutch-slip-threshold to determine the engagement status of the first clutch 324. For example, if the comparison result between the drive-shaft-speed-data and the rotor-shaft-speed-data indicates that the clutch-slip in the first clutch 324 exceeds the clutch-slip-threshold, the control unit may determine that the pick-up drive shaft rotational speed needs to be reduced to achieve re-engagement of the first clutch 324. Similarly, if the clutch-slip remains below the clutch-slip-threshold, the control unit 344 may determine that the pick-up drive shaft rotational speed does not need to be reduced. Compared to the previous embodiment, this embodiment has the advantage that the clutch-status-data is indicative of the engagement status of the first clutch 324 alone, such that the control unit may take remedial action that is suitable for the first clutch 324 only.

In another embodiment, the clutch-status-data may include position-data indicative of a location of the radial-pins 334a, 334b, 334c, 334d shown in FIG. 5. In particular, the position-data may be indicative of a position of the radial-pins 334a, 334b, 334c, 334d with respect to their corresponding recesses 336a, 336b, 336c, 336d. The position-data may be provided by an optical sensor arranged within the first clutch 324. The optical sensor may provide binary position-data to the control unit 344. In one example, the optical sensor may provide position-data indicative of whether the radial-pins 334a, 334b, 334c, 334d are fully extended or fully retracted. If the position-data indicates that the radial-pins 334a, 334b, 334c, 334d are fully extended, the control unit 344 may determine that the first clutch is engaged. Similarly, if the position-data indicates that the radial-pins 334a, 334b, 334c, 334d are fully retracted, the control unit 344 may determine that the first clutch 324 is disengaged.

In yet another embodiment, the clutch-status data received by the control unit may include temperature-data. The temperature-data may be indicative of heat generated within the first clutch 324 and/or the second clutch 340. Accordingly, the temperature-data may be provided by a temperature sensor associated with the first clutch 324 and/or the second clutch 340. As will be appreciated, the first clutch 324 will not produce significant amounts of heat, for as long as the they are fully engaged. If the first clutch 324 is disengaged, relative movement or clutch-slip between the clutch rotor 330 and the clutch housing 332 will generate heat within the first clutch 324 that may be detected by a corresponding temperature sensor. If the second clutch 340 is disengaged, no heat is generated between its friction surfaces. If the second clutch is fully engaged, small amounts of heat are generated. If the second clutch 340 is slipping, relative movement between the friction surfaces will generate large amounts of heat within the second clutch 340 that may be detected by a corresponding temperature sensor. Accordingly, the control unit 344 may be configured to receive the temperature-data from a temperature sensor and compare the values of the temperature-data to a corresponding temperature-threshold. In the first clutch 324, if the temperature values of the temperature-data exceed the temperature-threshold, the control unit may determine that the first clutch 324 is disengaged. By contrast, if the temperature values of the temperature-data remain below the temperature-threshold, the control unit 344 may determine that the first clutch 324 is engaged.

Of course, a disengagement of or slip within one or both of the clutches 340 during operation of the baler is generally only desired for as long as overload protection is required. For example, while the first clutch 324 is disengaged, no more plant matter is fed into the pre-compression chamber, thereby temporarily stopping the baling process. Accordingly, the control unit 344 of the present disclosure is configured to automatically re-engage the first clutch 324 if the clutch-status-data indicates that the first clutch 324 is disengaged. The baling system of the present disclosure may also automatically reduce clutch slip within the second clutch 340 if the clutch-status-data indicates that the second clutch 324 slipping. In the following, the control of the first clutch 324 will be described in detail. However, it should be appreciated that the same or similar algorithms may be applied by the control unit to control the second clutch 340.

The control unit 344 is configured to determine a speed-control-signal for varying the rotational speed of the pick-up drive shaft 310 on the basis of the clutch-status-data. If, on the basis of any of the exemplary clutch-status-data described above, the control unit 344 determines that the first clutch 324 is disengaged, the control unit 344 may determine a speed-control-signal for reducing the rotational speed of the pick-up drive shaft 310 to a "reduced" speed that allows for re-engagement of the first clutch 324. If, however, the clutch-status-data indicates that the first clutch 324 is engaged, the control unit may determine a speed-control-signal that maintains the pick-up drive shaft 310 at a "normal" rotational speed.

The speed-control-signal determined by the control unit 344 may be transferred by the control unit 344 to any part of the baler driveline that may be used to vary the rotational speed of the pick-up drive shaft 310. For example, the speed-control-signal may be provided to any transmission arranged between the input shaft 27 shown in FIG. 1 and the pick-up drive shaft 310 shown in FIG. 3. Turning back to the example of FIG. 1, the speed-control-signal may be provided by the control unit 344 to the drive converter 31 and/or the transmission 38.

In one embodiment, the speed-control-signal is provided to the transmission 38 described above. During normal operation of the baler, and as has been described above, the transmission 38 will be set to the second transmission ratio G2 at which the flywheel shaft 29 is driven faster than when the transmission is set to its first transmission ratio G1. It will be appreciated that the pick-up drive shaft 310 is ultimately connected to the flywheel shaft 29 such that selecting the second transmission ratio G2 of the transmission 38 will result in the pick-up drive shaft being driven at a first "normal" rotational speed. By contrast, by selecting the first transmission ratio G1 of the transmission 38 results in the pick-up drive shaft 310 being driven at a second "reduced" rotational speed.

The speed-control-signal provided by the control unit 344 may be for controlling the components (e.g. the clutches 49, 54 or the brake 58) of the transmission. If the clutch-status-data indicates that the first clutch 324 is disengaged, the speed-control-signal may be for disengaging the second clutch 54 (the first clutch 49 remaining disengaged). Once the second clutch 54 is disengaged, no more drive power/rotational speed is transferred from the input shaft 27 to the flywheel 28. It follows that the pick-up drive shaft 310 is then only driven by the remaining momentum of the flywheel 28 and so the rotational speed of the pick-up drive shaft 310 will reduce together with the rotational speed of the flywheel. The control-unit may maintain this state of the transmission 38 until the speed of the flywheel 28 and thus the rotational speed of the pick-up drive shaft 310 have dropped far enough for the first clutch 324 to re-engage. Optionally, the control-unit may speed up this process by activating the brake 58 together with disengaging the second clutch 54, thereby actively slowing the flywheel 28 and the pick-up drive shaft 310.

The control unit may reduce the speed of the pick-up drive shaft 310, by keeping both clutches 49, 54 disengaged, for as long as the clutch-status-data indicates that the first clutch 324 remains disengaged. Accordingly, the control unit may be configured to keep monitoring the clutch-status even after the first clutch 324 has disengaged.

Once the control-unit determines, on the basis of the clutch-status-data that the first clutch 24 has re-engaged, the control unit may provide a speed-control-signal for engaging the first clutch 49 of the transmission, thereby selecting the first transmission ratio G1 discussed above. The first transmission ratio G1 may be used to accelerate the flywheel 28 and thus the pick-up drive shaft 310 once again. Once the first clutch is fully engaged, the control unit may disengage the first clutch 49 and re-engage the second clutch 54 to select the second transition ratio G2 for bringing the pick-up drive shaft 310 back up to its first "normal" rotational speed. In the above example, the control unit 344 is configured to dynamically determine a suitable second, "reduced" rotational speed for re-engagement of the first clutch 324 during operation of the baler.

In a similar embodiment, the control unit 344 may determine speed-control-signals that incrementally decrease the speed of the pick-up drive shaft 310 until the clutch-status-data indicates that the first clutch 324 has re-engaged. This may be different to the above embodiment in that the input shaft may not be disengaged from the flywheel altogether. Rather, the control unit may provide speed-control-signals for incrementally decreasing the rotational speed of the pick-up drive shaft 310 to any one or more parts of the driveline between the input shaft 27 and the pick-up drive shaft 310 that are suitable for varying the speed of the pick-up drive shaft 310 while the flywheel 28 is still driven by the input shaft 27. For example, in one embodiment, the speed-control-signal may be provided to one or more components of the drive converter 31 to gradually/incrementally decrease the speed of the drive-shaft.

In one embodiment, the control unit will provide the speed-control-signal to driveline components that can vary the rotational speed of the pick-up drive shaft 310, without affecting the rotational speed of the input shaft 27. Accordingly, the input shaft 27 of this embodiment may still be used to power other parts of the agricultural baler 10, such hydraulic pumps at a "normal" speed.

In a further embodiment, the speed-control-signal may be forwarded by the control unit 344 to a corresponding work vehicle, such as the tractor 11 shown in FIG. 1, to vary the speed of the PTO shaft connected to the baler 10. In this embodiment, the speed-control-signal is an input-power-control-signal that may either be provided as a prompt to the operator of the tractor 11 (e.g. prompting the operator to reduce the PTO shaft speed) or may be used to automatically change the PTO speed. If the PTO speed is changed automatically, the input-power-control-signal may, for example, be applicable to change transmission ratios of a tractor transmission that drives the PTO shaft.

In some situations, it may not be possible to re-engage the first clutch 324 simply by decreasing the speed of the pick-up shaft 310. In particular, if debris is stuck in one of the rollers 302, 304 of the pick-up arrangement, this may cause continued overload of the pick-up arrangement until the debris is removed.

In one embodiment, the control unit 344 may be configured to provide a roller-jam-signal to the operator if the first clutch 324 is not successfully re-engaged after decreasing the speed of the pick-up drive shaft 310. In one embodiment, the control unit 344 may compare the current speed of the pick-up drive shaft 310 with a roller-jam-speed-threshold. In particular, if the control unit 344 determines that the rotational speed of the pick-up drive shaft 310 has been reduced to a value that is below the roller-jam-speed-threshold without the first clutch 324 re-engaging, the control unit 344 may provide the above roller-jam-signal to the operator. In one embodiment, the control unit 344 is configured to wait for a predetermined period of time after the rotational speed of the pick-up drive shaft 310 has fallen below the roller-jam-speed-threshold before informing the operator.

The roller-jam-signal may prompt the operator to service the pick-up arrangement, e.g. to remove debris that is blocking one or more of the roller 302, 304. Together with providing the roller-jam-signal to the operator, the control unit 344 may provide a speed-control-signal for interrupting power transfer to the pick-up drive shaft 310. In other words, the speed-control-signal may be determined by the control unit such that the pick-up drive shaft 310 will be stopped if the rotational speed of the pick-up drive shaft 310 is maintained below the roller-jam-speed-threshold for a predetermined period of time without successfully re-engaging the first clutch 324.

If the operator has successfully removed the cause for blockage of the pick-up arrangement, he may provide the control-unit 344 with a reset-input on the basis of which the control unit may trigger a reset-routine. The reset-routine may comprise running the pick-up drive shaft at a "decreased" second speed for a predetermined period of time or until the clutch-status-data indicates that the first clutch 324 has re-engaged. The reset-routine may further comprise increasing the speed of the pick-up drive shaft 310 to its first "normal" rotational speed after the predetermined period of time or if the clutch-status-data indicates that the first clutch 324 has re-engaged.

The control unit 344 may also be configured to determine a work-vehicle-control-signal for slowing or stopping the work vehicle on the basis of the clutch-status-data. In particular, if the control unit determines on the basis of the clutch-status-data that the first clutch 324 is disengaged, the control unit 344 may forward a work-vehicle-control-signal to the tractor 11 for slowing or stopping the work vehicle. This is because when the first clutch is disengaged, no rotational power is transferred to the rollers 302, 304 of the pick-up arrangement, such that no new plant matter is fed into the pre-compression chamber. In this case, plant matter can temporarily not be picked up from the windrows until the first clutch 324 is re-engaged. Accordingly, the work-vehicle-control-signal may be used to stop or slow down the tractor 11 until the pick-up arrangement is fully functional again, i.e. when the first clutch 324 is re-engaged. The work-vehicle-control-signal may be provided to the operator as a user prompt to stop driving. Alternatively, the work-vehicle-control-signal may be automatically applied to stop the tractor 11 from moving any further. In this example, the work-vehicle-control-signal may bring the tractor 11 automatically to a standstill without affecting the provision of drive power to the baler via the PTO shaft 13. Together with the work-vehicle-control-signal may also inform the operator of the reason why the tractor is being stopped.

Figure 6:
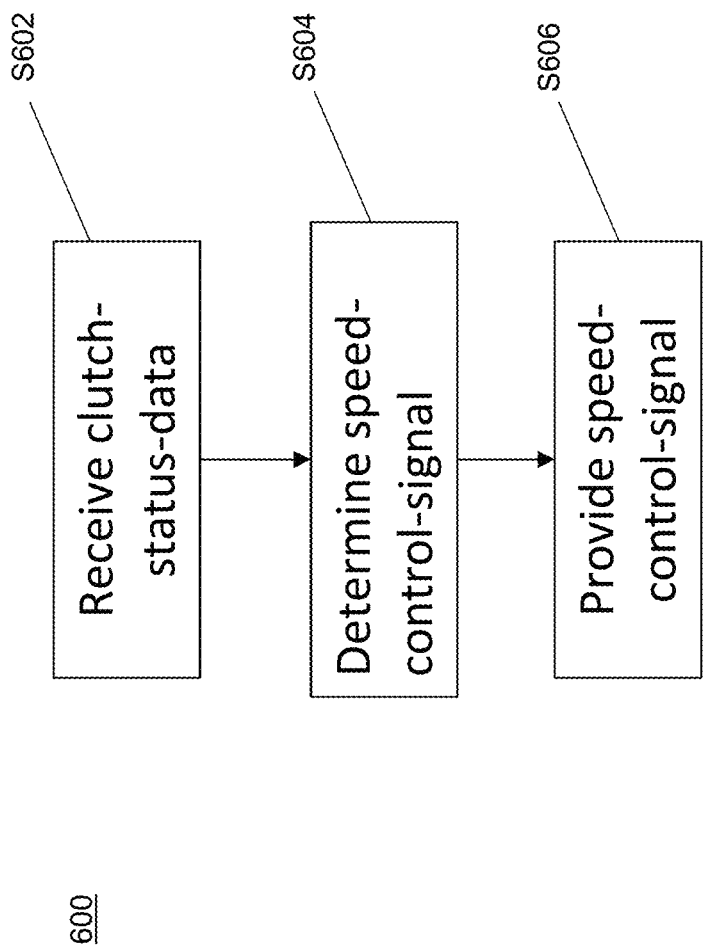
FIG. 6 is a schematic flow chart of an embodiment of the method of the present disclosure.

Turning to FIG. 6, there is shown a schematic flow chart of a method of an embodiment of the present disclosure. The computer-implemented method 600 shown in FIG. 6 is for controlling an agricultural baler, said agricultural baler comprising a pick-up arrangement for collecting plant matter. The pick-up arrangement comprises at least one roller. The baler further comprises a pick-up drive shaft for moving the roller at a rotational speed. The pick-up drive shaft is connected to the roller via a first clutch for selectively transferring power to the roller.

The method comprises a first step S602 for receiving clutch-status-data indicative of an engagement status of the first clutch. As mentioned before, the clutch-status-data may comprise any kind of data that may be used by the control unit to determine the engagement status of the first clutch.

In a second step S604, the method comprises determining a speed-control-signal for varying the rotational speed of the pick-up drive shaft on the basis of the clutch-status-data. In general, this second step S604 may include decreasing the rotational speed of the pick-up drive shaft if the clutch-status-data indicates that the first clutch is disengaged. Similarly, the second step S604 may include resetting the rotational speed of the pick-up drive shaft to a "normal" speed for normal operation of the baler, if, on the basis of the clutch-status-data, the control unit determines that the first clutch has been re-engaged after a previous cut-out.

In a third step S606, the speed-control-signal is provided to a driveline for driving the pick-up drive shaft. In particular, the speed-control-signal may be provided to any component of the driveline between the input shaft of the baler and the pick-up drive shaft that is capable of changing the speed of the pick-up drive shaft, preferably without changing the speed of the input shaft of the baler.

The listing or discussion of an apparently prior-published document in this specification should not necessarily be taken as an acknowledgement that the document is part of the state of the art or is common general knowledge.

Preferences and options for a given aspect, feature or parameter of the disclosure should, unless the context indicates otherwise, be regarded as having been disclosed in combination with any and all preferences and options for all other aspects, features and parameters of the disclosure.

The invention claimed is:

1. An agricultural system, comprising:
an agricultural baler comprising:
a pick-up arrangement for collecting plant matter, the pick-up arrangement comprising a roller for feeding crop into the baler;
a clutch; and
a pick-up drive shaft for moving the roller at a desired rotational speed, the pick-up drive shaft connected to the roller by the clutch for selectively transferring power between the pick-up drive shaft and the roller; and
a control unit configured to:
receive clutch-status-data indicative of an engagement status of the clutch;
determine a speed-control-signal for varying the rotational speed of the pick-up drive shaft based on the clutch-status-data;
provide the speed-control-signal to a driveline for driving the pick-up drive shaft;
determine the speed-control-signal for driving the pick-up drive shaft at:
a first rotational speed for normal operation of the pick-up arrangement and
a second rotational speed for re-engagement of the clutch, the second rotational speed being slower than the first rotational speed; and
determine the speed-control-signal for:
selecting the first rotational speed if the clutch-status-data is indicative of the clutch being engaged; and
selecting the second rotational speed if the clutch-status-data is indicative of clutch-slip occurring in the clutch.

2. The agricultural system of claim 1, wherein the clutch-status-data comprises one or more of:
clutch-slip-data indicative of a difference in rotational speed between an input side and an output side of the clutch;
position-data indicative of a location of an engagement component of the clutch; and
temperature-data indicative of heat generated within the clutch.

3. The agricultural system of claim 1, wherein the control-unit is configured to determine the speed-control-signal for selecting the first rotational speed if the clutch-status-data is indicative of the clutch being engaged for a predetermined amount of time, when the pick-up drive shaft is being driven at the second rotational speed.

4. The agricultural system of claim 1, wherein the agricultural baler further comprises a load sensor for determining a load acting on the roller during operation, and wherein the control unit is configured to determine the speed-control-signal applicable to select the first rotational speed only if the load acting on the roller is below a predetermined load threshold.

5. The agricultural system of claim 1, wherein the second rotational speed is a predetermined speed.

6. The agricultural system of claim 1, wherein the control unit is configured to determine the second rotational speed, when the clutch-status-data is indicative of clutch-slip occurring in the clutch, by decreasing the rotational speed of the pick-up drive shaft, starting from the first rotational speed, until the clutch-status-data is indicative of the clutch being re-engaged.

7. The agricultural system of claim 1, wherein the clutch is a radial pin slip-clutch.

8. The agricultural system of claim 1, wherein the agricultural baler further comprises a rotary input shaft connected by the driveline to the pick-up drive shaft, and wherein the driveline includes a transmission for selectively moving the pick-up drive shaft at various speeds that differ from a rotational speed of the input shaft.

9. The agricultural system of claim 8, wherein the transmission includes a transmission clutch for selectively transferring power between the input shaft and the pick-up drive shaft, and wherein the control unit is configured to provide the speed-control-signal to the transmission clutch to control engagement of the transmission clutch on the basis of the clutch-status-data.

10. An agricultural system, comprising:
   an agricultural baler comprising:
      a pick-up arrangement for collecting plant matter, the pick-up arrangement comprising a roller for feeding crop into the baler;
      a clutch; and
      a pick-up drive shaft for moving the roller at a desired rotational speed, the pick-up drive shaft connected to the roller by the clutch for selectively transferring power between the pick-up drive shaft and the roller;
   a control unit configured to:
      receive clutch-status-data indicative of an engagement status of the clutch;
      determine a speed-control-signal for varying the rotational speed of the pick-up drive shaft based on the clutch-status-data; and
      provide the speed-control-signal to a driveline for driving the pick-up drive shaft and
   a rotary input shaft connected by the driveline to the pick-up drive shaft, and wherein the driveline includes a transmission for selectively moving the pick-up drive shaft at various speeds that differ from a rotational speed of the input shaft
   wherein the transmission includes components defining at least first and second selectable transmission ratios between the input shaft and the pick-up drive shaft, the speed-control-signal applicable for selecting the first or the second transmission ratio, and wherein, when the second transmission ratio is selected, the pick-up drive shaft moves at a first rotational speed and, when the first transmission ratio is selected, the pick-up drive shaft moves at a second rotational speed, the second rotational speed being slower than the first rotational speed, and wherein the speed-control-signal is for selecting the first transmission ratio if the clutch-status is indicative of clutch-slip occurring in the clutch.

11. The agricultural system of claim 1, wherein the agricultural system further comprises an agricultural work vehicle connected to the baler.

12. The agricultural system of claim 11, wherein the control-unit is further configured to determine a work-vehicle-control-signal for slowing or stopping the work vehicle based on the clutch-status-data.

13. A computer-implemented method for controlling an agricultural baler, said agricultural baler comprising:
   a pick-up arrangement for collecting plant matter, the pick-up arrangement comprising a roller;
   a clutch; and
   a pick-up drive shaft for moving the roller at a rotational speed, the pick-up drive shaft connected to the roller by the clutch for selectively transferring power to the roller,
   wherein the method comprises:
      receiving clutch-status-data indicative of an engagement status of the clutch;
      providing a speed-control-signal to a driveline for driving the pick-up drive shaft;
      determining the speed-control-signal for driving the pick-up drive shaft at:
         a first rotational speed for normal operation of the pick-up arrangement and
         a second rotational speed for re-engagement of the clutch, the second rotational speed being slower than the first rotational speed, and
      determining the speed-control-signal for:
         selecting the first rotational speed if the clutch-status-data is indicative of the clutch being engaged; and
         selecting the second rotational speed if the clutch-status-data is indicative of clutch-slip occurring in the clutch.

* * * * *